A process for coating substrates is disclosed. In particular, a process is disclosed for painting metal objects such as automobile bodies by electrostatic spray of specifically limited powder coating compositions. More particularly, this invention is concerned with a process for painting metal objects by electrostatic spray of powder coating compositions which utilize as the thermosettable component a blend of a polymer of an anhydride of a dicarboxylic acid and an epoxy-functional, anhydride-functional, self-crosslinking copolymer of ethylenically unsaturated monomers. This copolymer is deficient in anhydride-functionality. This copolymer has a glass transition temperature in the range of 40° to 90°C, preferably 50° to 70°C, and a molecular weight ($\overline{M}_n$) in the range of about 2,000 to about 10,000. The polyanhydride of the blend has a molecular weight in the range of about 300 to about 4,000, preferably about 1,500 to about 2,500.

United States Patent

Labana et al.

[11] 3,919,345
[45] *Nov. 11, 1975

[54] POWDERED COATING COMPOSITION CONTAINING POLYANHYDRIDE, EPOXY AND ANHYDRIDE FUNCTIONAL COPOLYMER AND FLOW CONTROL AGENT

[75] Inventors: Santokh S. Labana, Dearborn Heights; Ares N. Theodore, Farmington, both of Mich.

[73] Assignee: Ford Motor Company, Dearborn, Mich.

[*] Notice: The portion of the term of this patent subsequent to Sept. 11, 1990, has been disclaimed.

[22] Filed: Mar. 4, 1974

[21] Appl. No.: 448,160

[52] U.S. Cl.... 260/830 R; 117/132 BE; 260/17.4 R; 260/30.6 R; 260/31.8 E; 260/31.8 M; 260/42.28; 260/824 EP; 260/830 TW; 260/836; 260/DIG. 16; 260/DIG. 17; 260/DIG. 19
[51] Int. Cl.² .......................................... C08L 63/00
[58] Field of Search ........................ 260/830 R, 836

[56] References Cited
UNITED STATES PATENTS

| | | | |
|---|---|---|---|
| 3,752,870 | 8/1973 | Labana et al. | 260/836 |
| 3,758,632 | 9/1973 | Labana et al. | 260/830 R |
| 3,781,379 | 12/1973 | Labana et al. | 260/836 |
| 3,787,521 | 1/1974 | Labana et al. | 260/836 |

Primary Examiner—Paul Lieberman
Attorney, Agent, or Firm—Olin B. Johnson; Keith L. Zerschling

10 Claims, No Drawings

POWDERED COATING COMPOSITION CONTAINING POLYANHYDRIDE, EPOXY AND ANHYDRIDE FUNCTIONAL COPOLYMER AND FLOW CONTROL AGENT

BACKGROUND OF THE INVENTION

Powder coating compositions are extremely desirable for the reason that they are free of the organic solvents utilized in conventional liquid paint systems and released when films therefrom are cured by baking. A liquid paint system employing such solvents is disclosed in U.S. Pat. No. 2,856,354 issued Oct. 21, 1958. A powder coating paint composition is curable by heat in a manner such that little, if any, volatile material is given off to the environment.

When the substrate to be painted is metal, the two methods employed to apply a powder paint in industrial applications is electrostatic spray painting and the fluidized solids technique wherein a preheated metal object is passed into fluidized powder coating material and withdrawn. The minimum film deposit obtainable by the latter method is substantially in excess of that employed in the painting of automobile bodies and various other articles of manufacture.

When powder paint is used to coat automobile bodies and various other articles of manufacture formed from metal, with an average depth per coating, e.g., prime or topcoat, in the range of 1–3 mils (0.001 to 0.003 in.) or less the most effective method of application is that known to the art as electrostatic spray painting.

The powder coating compositions heretofore applied by electrostatic spray painting have included both thermosetting compositions and thermoplastic compositions. The thermosetting compositions heretofore disclosed include those in which the principal film-forming component is a self-crosslinking copolymer, e.g., our U.S. Pat. No. 3,758,632, and those in which the principal film-forming component is a qualitatively mono-, di- or tri-functional, quantitatively polyfunctional copolymer blended with a monomeric or polymeric crosslinking agent, e.g., our U.S. Pat. No. 3,781,379.

A powder coating composition for painting by electrostatic spray application is desirably relatively easy to prepare and process, uniform in composition and particle size, dry and free flowing, resistant to phase separation, resistant to premature set-up, and flows to even smoothness on baking. In the case of automobile paints, the cured films thus prepared should afford an attractive appearance, a high chip resistance, and, while intact, a high corrosion resistance.

Powder coating compositions comprising (1) an epoxy-functional copolymer of a glycidyl acrylate and other olefinically unsaturated monomers and (2) an anhydride crosslinking agent have been described heretofore in our U.S. Pat. No. 3,781,379 in U.S. Pat. application, Ser. No. 394,887, filed Sept. 6, 1973 by A. N. Theodore, a coinventor herein, et al.; in U.S. Pat. application Ser. No. 394,876 filed Sept. 6, 1973 by A. N. Theodore, a coinventor herein, et al. and now abandoned; in U.S. Pat. application Ser. No. 394,878 filed Sept. 6, 1973 by A. N. Theodore, a coinventor herein, et al. and now abandoned; in our U.S. Pat. application Ser. No. 394,879, filed Sept. 6, 1973; in U.S. Pat. application Ser. No. 394,880 filed Sept. 6, 1973 by S. S. Labana, a coinventor herein, et al. and now abandoned; in our U.S. Pat. application Ser. No. 394,881 filed Sept. 6, 1973 now abandoned; in our U.S. Pat. application Ser. No. 426,168 on Dec. 19, 1973; in our U.S. Pat. application Ser. No. 426,169 filed Dec. 19, 1973 and in our U.S. Pat. application Ser. No. 426,164 filed on Dec. 19, 1973.

THE INVENTION

An improved process of painting automobile bodies and other manufactured products of metal comprises electrostatic spray application of powder coating material wherein the sole or principal, i.e., in excess of 50% by weight, film-forming component is a blend of a self-crosslinking copolymer of ethylenically unsaturated monomers and a polyanhydride.

The copolymer is an epoxy-functional anhydride-functional, self-crosslinking copolymer of ethylenically unsaturated monomers. This copolymer contains a glycidyl ester of a monoethylenically unsaturated acid, e.g., glycidyl acrylate, glycidyl methacrylate, etc., which provides the copolymer with its epoxy functionality. This copolymer also contains a monomeric anhydride of an olefinically unsaturated, preferably an alpha-beta olefinically unsaturated, dicarboxylic acid, e.g., maleic anhydride, itaconic anhydride, etc., which provides the copolymer with its anhydride functionality. The balance of the copolymer is made up of monofunctional, ethylenically unsaturated monomers consisting essentially of carbon, hydrogen and oxygen.

This copolymer is self-crosslinking when a film comprising such copolymer is baked but does not provide the degree of crosslinking desired to assure that the resulting film has good chip resistance. To obtain coatings with good chip resistance, the copolymer must contain a relatively high concentration of epoxy groups and have available a relatively high concentration of anhydride groups to crosslink herewith. With random positioning of the epoxy-functional units and anhydride-functional units in the copolymer, a portion of the anhydride groups will not participate in the crosslinking reaction. If the number of anhydride groups in the copolymer is increased to a level that will assure substantially complete crosslinking reaction of the polymer at the epoxide sites, the copolymer is less stable, inclined to premature set-up or caking, and difficult to prepare, process and apply.

The high degree of crosslinking desired is achieved by leaving the copolymer deficient in anhydride groups, i.e., substantially below the concentration that would assure complete crosslinking of the epoxy groups in a self-crosslinking cure. The additional crosslinking desired is obtained by blending with the copolymer about 2 to about 8% by weight (based on copolymer weight) of a polyanhydride, e.g., poly(adipic anhydride), poly(azelaic anhydride), poly(sebasic anhydride), etc.

DETAILED DESCRIPTION OF THE INVENTION

The powder coating materials of and used in this invention can be applied by any of the electrostatic spray painting equipment for spraying powders which is commercially available.

This equipment may take on a variety of forms. Whatever the equipment used, the basic process involves the same essentials, i.e., means for maintaining the necessary difference of electrical potential between the object to be coated and the electrode of the powder emitting means to provide therebetween the electrostatic field which serves to guide the powder to the object and means for propelling the powder from the emitting device as a powder spray. The combined influences of such propelling means and such electrostatic field move and direct the powder to deposition on the object which must be an electrical conductor. While other electrical arrangements are obviously available and known to the art, the necessary difference of electrical potential is ordinarily produced by having the object to be coated at ground potential while the electrode of the emitting device is maintained at a potential ranging from about 25,000 to about 125,000, preferably about 50,000 to about 90,000 volts. While this difference may be relatively positive or relatively negative with respect to ground, it is most commonly a negative potential. While the electrode of the emitting device may also be the propelling means as in those embodiments wherein the electrode is a spinning disc or spinning cup from which the powder particles are thrown outward by centrifugal force and then drawn toward the object in an arcing pattern by the electrostatic field, the powder must be transported or propelled into or onto such electrode and this is conventionally effected with an air stream containing such powder. The air stream is provided by a conventional compressed air source into which the powder is fed. In other embodiments wherein the electrode of the emitting device is stationery, the propelling force between emitter and object is the powder-carrying air stream. In such an embodiment, the powder passes across or in close proximity to the electrode of the emitting device and thence into the electrostatic field extending from such electrode to the object.

The powder coating compositions of, and used in, this invention comprise a thermosettable, film-forming component and may also contain pigments, particulate filler, plasticizers, anti-static agents, flow control agents and catalysts.

The thermosettable film-forming component made and used in accordance with this invention is a blend of about 2 to about 8 weight percent of a polymer of monomeric anhydrides of saturated dicarboxylic acids, e.g., poly(adipic anhydride), poly(azelaic anhydride), and poly(sebacic anhydride), and about 92 to about 98 weight percent of an epoxy-functional, anhydride-functional copolymer of monoethylenically unsaturated monomers. This copolymer contains about 10 to about 25, preferably about 12 to about 18 percent by weight of a glycidyl ester of monoethylenically unsaturated acid, e.g., glycidyl acrylate, glycidyl methacrylate, etc., about 4 to about 12, preferably about 4 to about 8, percent by weight of a monomeric anhydride of an olefinically unsaturated, dicarboxylic acid, e.g., maleic anhydride, itaconic anhydride, etc., and about 63 to about 86 percent by weight of monofunctional, ethylenically unsaturated monomers consisting essentially of carbon, hydrogen and oxygen. These are preferably selected from esters of acrylic or methacrylic acid and a $C_1$–$C_8$ monohydric alcohol and $C_8$–$C_{12}$ monovinyl hydrocarbons. Of these, the acrylates and methacrylates are most preferred.

Preferably, in excess of 50 weight percent of the copolymer monomers exclusive of the epoxy monomers and the anhydride monomers are the aforementioned esters of acrylic or methacrylic acid, e.g., methyl methacrylate, ethyl acrylate, butyl acrylate, butyl methacrylate, hexyl acrylate and 2-ethylhexyl methacrylate. Monovinyl hydrocarbons such as styrene, vinyl toluene, t-butyl styrene, chlorostyrene and alpha methyl styrene are suitable but preferably comprise less than 50 weight percent of the monofunctional monomers. Other vinyl monomers such as vinyl chloride, acrylonitrile, methacrylonitile and vinyl acetate may be used in minor amounts and their sum should be in the range of 0 to 30 percent by weight.

This copolymer has a glass transition temperature in the range of 40° to 90°C and average molecular weight ($\overline{M}_n$) in the range of about 2,000 to about 10,000.

The polyanhydride component has average molecular weight in the range of about 300 to about 4,000, preferably about 1,500 to about 2,500.

The complete powder paint composition is electrostatically sprayed upon the object to be coated employing a difference of electrical potential between the electrode of a conventional electrostatic powder spraying device and the object being coated in the range of about 25,000 to about 125,000, preferably about 50,000 to about 90,000 volts. It is subsequently baked at a temperature in the range of about 130° to about 200°C for a time in the range of about 10 minutes to about 30 minutes.

In preparing this copolymer, the epoxy-functional monomer and the anhydride-functional monomer are mixed with the aforementioned ethylenically unsaturated monomers which make up the balance of the copolymer and reacted by conventional free radical initiated polymerization in such proportions as to obtain the copolymer for the powder coating compositions.

Generally, a free radical initiator is needed to induce the polymerization reaction. A large number of free radical initiators are known to the art and are suitable for this purpose. These include benzoyl peroxide, lauryl peroxide, t-butylhydroxyperoxide, acetylcyclohexane sulfonyl peroxide, diisobutyryl peroxide, di-(2-ethylhexyl) peroxydicarbonate, di-isopropyl peroxydicarbonate, t-butylperoxypivalate, dicanoyl peroxide, azobis (2-methylpropionitride) etc.

The polymerization is preferably carried out in solution using a solvent in which the resulting epoxy-functional, anhydride-functional copolymer is soluble. Among the solvents suitable for this polymerization are toluene, xylene, dioxane, butanone, etc.

If the epoxy-functional, anhydride-functional copolymer is prepared in solution, the solid copolymer can be precipitated by pouring the solution at a slow rate into a non-solvent for such copolymer, e.g., hexane or octane under agitation. The copolymer precipitate is further dried so that it contains less than 3 percent of materials that volatilize at the temperatures used for baking the coatings to be made from such copolymer.

These copolymers can also be prepared by emulsion polymerization, suspension polymerization, bulk polymerization or their suitable combinations. In these methods of preparing the copolymer chain transfer agents may be required to control the molecular weight of the copolymer to a desired range. The solid copolymers obtained by these methods must also be dried to contain less than three percent of materials that volatilize at the temperatures used for baking the coatings prepared therefrom.

For powder coating applications, both molecular weight and molecular weight distribution of the epoxy-functional, anhydride-functional copolymer is important. While the molecular weight ($\overline{M}_n$) range extends from about 2,000 to about 10,000, preferably about 2,500 to about 6,000, the copolymer component must not contain significant amounts of higher molecular weight fractions. No more than 5 percent of the copolymer should be of molecular weight greater than 20,000. The molecular weight distribution as measured by the ratio of weight average molecular weight to number average molecular weight ($Mw/Mn$ should be in the range of 1.6 to 3.0. The preferred range of molecular weight distribution is in the range of 1.7 to 2.2.

The polyanhydride component of the thermosetable blend is a standard article of commerce and can be purchased.

These powder coating compositions advantageously contain a flow control agent as a part of the powder coating mixture. The flow control agent is a polymer having a molecular weight ($\overline{M}_n$) of at least 1,000 and advantageously comprises between 0.05 and 4.0 percent by weight. The flow control agent has a glass transition temperature at least 20°C below the glass transition temperature of the mixture's copolymer.

One group of suitable flow control agents are acrylic polymers. Preferred acrylic polymers which may be used for the flow control agent are poly(lauryl acrylate), poly(butyl acrylate, poly(2-ethylhexyl acrylate), poly(lauryl methacrylate) and poly(isodecyl methacrylate).

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2,500 and perfluoro octanoic acid is a useful flow control agent. Polymeric siloxanes of molecular weight of over 1,000 (advantageously 1,000 to 20,000) may also be used, e.g., poly(-dimethyl siloxane) or poly(methylphenyl siloxane).

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200°C. and the catalyst should produce a gel time for the powder coating composition at the baking temperature to be used which is at least 1 minute but no greater than 20 minutes. This gel time is preferably in the range of 1 to 12 minutes and most preferably between about 2 and about 8 minutes at the baking temperature.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. suitable catalysts of the imidazole type include: 2-methyl-4-ethyl imidazole, 2-methyl imidazole, imidazole, 2 - [(N-benzylanilino) methyl]-2 - imidazoline phosphate, and 2-benzyl - 2 - imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphtenate, zinc octoate, stannous 2 - ethyl-hexoate, phenylmercuric propionate, lead neodecanoate, dilbutyl tin dilaurate and lithium benzoate.

The catalyst used in an individual powder coating composition is generally solid at room temperature and has a melting point of from 50° to 200°C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkylpoly (ethyleneoxy) phosphate or alkylaryl poly (ethyleneoxy) phosphates as, for example, ethyl benzyl poly (ethyleneoxy) phosphate; polyethyleneimine, poly (2-vinyl pyrollidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: di-hexyl adipate, diisooctyl adipate, dixyclohexyl adipate, tri-phenylphosphate, tricresylphosphate, tributylphosphate, dibutylphthalate, dioctylphthalate, butyl octyl phthalate, dioctyl sebacate, butyl benzyl sebacate, dibenxyl sebacate, butanediol - 1.4 - digylcidyl ether, digylcidyl ether of Bisphenol A and its polymers and cellulose acetate butyrate.

Having described the various materials which are employed in formulating the powder coating compositions of this invention, a plurality of examples are hereinafter set forth to illustrate various individual powder coating compositions. Illustrated copolymers vary in molecular weight from about 2,000 to about 10,000 and the polyanhydrides illustrated vary in molecular weight from about 300 to about 3,000.

EXAMPLE 1

An epoxy-functional, anhydride-functional copolymer is prepared from the below listed components in the manner hereinafter described:

| Reactants | Amount(g) | Percent by Weight of Total Reactants |
|---|---|---|
| glycidyl methacrylate | 30.0 | 15 |
| maleic anhydride | 14.0 | 7 |
| butyl methacrylate | 100.0 | 50 |
| methyl methacrylate | 56.0 | 28 |

The above-mentioned monomers are admixed in the proportions above set forth and 12.0 grams (6.0%) of 2.2' -azobix - (2-methylpropionitride), hereinafter called AIBN, are added to the mixture. The maleic anhydride was dissolved in 35 ml. acetone and then combined with rest of monomers and initiator. The mixture is slowly added, i.e., dropwise over a 2-hour period, to 200 ml. of toluene heated to 80°–95°C, which is being stirred vigorously under a nitrogen atmosphere. After addition is complete, 0.2 grams of AIBN dissolved in 15 ml. acetone are added over a one-half hour-period and refluxing is carried out for 3 additional hours.

The toluene solution of the copolymer (50% copolymer) is diluted with 150 ml. of acetone and coagulated in 2 liters of hexane. The copolymer is removed from the hexane and dried in an oven for 20 hours at 55°C. The molecular weight of this copolymer is found to be Mw/Mn = 6210/3350. It has a Tg (Glass Transition Temperature) of 51°C.

A powder coating composition is prepared from the following materials in the manner hereinafter set forth:

|  | Grams |
| --- | --- |
| copolymer (prepared above) | 50.0 |
| poly(azelaic anhydride) 2,200 Ave. Mol. Wt. | 3.0 |
| (2-hydroxyethyl) dimethyl- (3 - stearamidopropyl) - ammonium nitrate (50% solution in isopropanol) | 0.31 |
| titanium dioxide | 5.0 |
| Ferrite Yellow | 4.0 |
| poly(2-ethylhexylacrylate) $\overline{M}_n = 9,000$ | 0.41 |

After ball-milling the mixture for 5 hours, it was mill-rolled for 7 minutes at 110°C. Subsequently, the cooled melt is granulated and pulverized in a fluid energy mill. The finished powder has an average particle size of 20 microns. After electrostatic deposition of powder on grounded steel panels by using an electrostatic spray hand gun (50 KV charging voltage), the coatings are baked at 160°C for 20 minutes.

The cured coatings exhibit good adhesion on steel panels. This coating is applied to other substrates such as glass, copper and aluminum by a convention air spray gun (non-electrostatic). Gloss and impact strength are good in all tests. The coatings are tested for organic solvent resistance and found to be insoluble in xylene, toluene, methyl ethyl ketone, methanol and gasoline.

EXAMPLE 2

Fifty grams of the epoxy-functional, anhydride-functional copolymer of Example 1 are combined with the following materials:

|  | Grams |
| --- | --- |
| diepoxide (Epichlorohydrin Bis phenol A type - average mol. wt. 900, WPE 500) | 2.5 |
| poly(azelaic anhydride), ave. mol. wt. 2,200 | 4.0 |
| titanium dioxide | 5.0 |
| Ferrite Yellow | 4.0 |
| N,N - bis (2-hydroxymethyl) -N- (3' - dodecyloxy - 2' - hydroxypropyl) methyl ammonium methosulfate | 0.3 |
| poly (2-ethylhexyl acrylate), $\overline{M}_n = 11,000$ | 0.4 |

This mixture is processed as in Example 1 and converted to a powder having an average particle size of about 15 microns. It is then sprayed electrostatically (60 KV charging voltage) on grounded steel panels and cured at 160°C for 20 minutes.

The cured coatings are glossy and smooth and suitably resistant to organic solvents.

EXAMPLE 3

An epoxy-functional anhydride-functional copolymer is prepared from the following materials in the manner hereinafter described:

| Reactants | Amount(g) | Percent by Weight of Total Reactants |
| --- | --- | --- |
| glycidyl methacrylate | 20 | 10 |
| itaconic anhydride | 14 | 7 |
| butyl methacrylate | 110 | 55 |
| methyl methacrylate | 56 | 28 |

The above-listed monomers are admixed in the proportions above set forth and to this mixture is added 10 grams of AIBN (5%). The polymerization and isolation of the copolymer is carried out as in Example 1. The molecular weight of this copolymer is $M_w/M_n = 5640/3500$ and its Tg is 48°C.

One hundred grams of copolymer solution (50% copolymer) are combined with 4.8 grams of titanium dioxide, 4.0 grams Ferrite Yellow, 0.25 grams tetrabutyl ammonium iodide, 0.3 grams of poly(2-ethylhexylacrylate) of $\overline{M}_n = 8,000$ and 2.0 grams of poly(azelaic anhydride). This mixture is ball-milled overnight and stripped off the solvent in a vacuum oven. The resulting powder has good flow properties.

After electrostatic deposition of the powder on grounded steel panels, the coatings are cured by baking at 160°C for 20 minutes. The glossy coating demonstrates good adhesion, impact strength and solvent resistance.

EXAMPLE 4

An epoxy-functional, anhydride-functional copolymer is prepared from the following materials in the manner hereinafter described:

| Reactants | Amount(g) | Percent by Weight of Total Reactants |
| --- | --- | --- |
| glycidyl methacrylate | 30 | 15 |
| itaconic anhydride | 14 | 7 |
| butyl methacrylate | 100 | 50 |
| methyl methacrylate | 56 | 28 |

The polymerization and isolation of the copolymer is carried out using the procedure of Example 1. AIBN in the amount of 10 grams is added to the original monomer mixture and 0.3 grams are added in 15 ml. acetone after addition of the monomers to the toluene solvent is complete.

Fifty grams of this copolymer are combined with 5.0 grams of titanium dioxide, 4.0 grams of Ferrite Yellow, 0.10 grams of tetrabutyl ammonium bromide, 0.4 grams of poly(2-ethylhexyl acrylate) of $\overline{M}_n$ 12,000 and 5.0 grams of poly(azelaic anhydride). This mixture is processed as in Example 1 and converted to a powder of desired particle size, i.e., average of about 20 microns. This powder is electrostatically sprayed (90KV charging voltage) on grounded steel panels and cured at 160°C for 25 minutes. The cured, pigmented films are glossy and smooth. They demonstrate solvent and impact resistance.

EXAMPLE 5

An anhdride-functional, epoxy-functional copolymer is prepared from the following materials:

| Reactants | Amounts(g) | Percentage By Weight of Total Reactants |
|---|---|---|
| glycidyl methacrylate | 30.0 | 15 |
| maleic anhydride | 8.0 | 4 |
| butyl methacrylate | 100.0 | 50 |
| methyl methacrylate | 50.0 | 25 |
| styrene | 12.0 | 6 |

The polymerization and isolation of polymers are carried out as in Example 1. The molecular weight of prepolymer is Mw/Mn = 6400/3400 and its Tg is 52°C.

Fifty grams of the copolymer are combined with 6.0 grams titanium dioxide, 4.5 grams of phthalocyanine blue, 0.1 grams of tetrabutyl ammonium chloride, 0.42 grams poly(2-ethylhexyl acrylate) and 4.0 grams of poly(azelaic anhydride). The mixture is processed as in Example 1 and converted to a powder of desired average particle size (about 20 microns). After spraying the powder on ground steel panels, they are cured at 170°C for 25 minutes.

The cured coatings had good adhesion and gloss. They demonstrate acceptable organic solvent resistance.

EXAMPLE 6

An anhydride-functional, epoxy-functional copolymer is prepared using the method of Example 1 from the following materials:

| Reactants | Amounts(g) | Percent by Weight |
|---|---|---|
| glycidyl methacrylate | 20 | 10 |
| maleic anhydride | 8 | 4 |
| butyl methacrylate | 100 | 50 |
| methyl methacrylate | 72 | 36 |

With these materials, there are used 0.8 grams of AIBN.

This copolymer is compounded into a coating material using the methods and materials of Example 1, sprayed upon a metal substrate as in Example 1 and cured as in Example 1. In this instance, 48.0 grams of this polymer are used with 2.0 grams of poly(azelaic anhydride) and 0.5 grams of poly (lauryl methacrylate).

EXAMPLE 7

An anhydride-functional, epoxy-functional copolymer is prepared by using the method of Example 1 from the following materials:

| Reactants | Amounts(g) | Percentage by Weight of Total Monomers |
|---|---|---|
| glycidyl methacrylate | 50 | 25 |
| maleic anhydride | 24 | 12 |
| butyl methacrylate | 86 | 43 |
| methyl methacrylate | 40 | 20 |

With these materials, there are used 7.0 grams of AIBN.

This copolymer is compounded into a coating material using the methods and materials of Example 1, sprayed upon a metal substrate as in Example 1 and cured as in Example 1. In this instance, 46.0 grams of this copolymer are used with 4.0 grams of poly(azelaic anhydride) and 0.6 grams of poly(lauryl acrylate).

EXAMPLE 8

An anhydride-functional, epoxy-functional copolymer is prepared by using the method of Example 1 from the following materials:

| Reactants | Amounts(g) | Percentage by Weight of Total Reactants |
|---|---|---|
| glycidyl methacrylate | 30.0 | 15 |
| maleic anhydride | 20.0 | 10 |
| butyl methacrylate | 10.0 | 5 |
| methyl methacrylate | 140.0 | 70 |

This copolymer is compounded into a coating material using the methods and materials of Example 1, sprayed upon a metal substrate as in Example 1 and cured as in Example 1. The pigmented films are slightly brittle due to the high concentration of methyl methacrylate. Tg is about 80°C.

EXAMPLE 2

An anhydride-functional, epoxy-functional copolymer is prepared by using the method of Example 1 from the following materials:

| Reactants | Amounts(g) | Percentage by Weight of Total Reactants |
|---|---|---|
| glycidyl methacrylate | 30.0 | 15 |
| itaconic anhydride | 20.0 | 10 |
| butyl methacrylate | 120.0 | 60 |
| methyl methacrylate | 30.0 | 15 |

Coating powder from this copolymer was prepared as in Example 1. In this instance, 0.5 grams of poly(butyl acrylate) of average molecular weight of about 2,580 are used for preparation of powder.

EXAMPLE 10

The procedure of Example 1 is repeated with the single difference that an equimolar amount of poly(sebasic anhydride) of average molecular weight of about 2,580 is substituted for the poly(azelaic anhydride).

EXAMPLE 11

The procedure of Example 1 is repeated with the single difference that an equimolar amount of poly(adipic anhydride) of average molecular weight of about 1,500 is substituted for the poly(azelaic anhydride).

EXAMPLE 12

The procedure of Example 1 is repeated with the single difference that the polyanhydride has average molecular weight between 300 and 400.

EXAMPLE 13

The procedure of Example 1 is repeated with the single difference that the polyanhydride has average molecular weight between 3,900 and 4,000.

EXAMPLE 14

The procedure of Example 1 is repeated with the single difference that the coatings are cured at about 200°C for about 10 minutes.

EXAMPLE 15

The procedure of Example 1 is repeated with the single difference that the coatings are cured at about 130°C for about 30 minutes.

EXAMPLE 16

The procedure of Example 1 is repeated with the single difference that the powder is sprayed onto the grounded steel panels from an electrostatic spray hand gun with a charging voltage of about 25 KV.

EXAMPLE 17

The procedure of Example 1 is repeated with the single difference that the powder is sprayed on the grounded steel panels from a reciprocating, automatic, electrostatic spray gun employing a charging voltage of 90 KV.

EXAMPLE 18

The procedure of Example 17 is repeated with the single difference that the charging voltage is 125 KV.

EXAMPLE 19

The procedure of Example 1 is repeated with the single difference that an equimolar amount of glycidyl acrylate is substituted for the glycidyl methacrylate in the copolymer.

EXAMPLE 20

The procedure of Example 1 is repeated with the single difference that the following monomers are used to form the copolymer:

| Reactants | Percentage by Weight of Total Reactants |
|---|---|
| glycidyl methacrylate | 12 |
| dodecenyl succinic anhydride | 8 |
| butyl methacrylate | 33 |
| butyl acrylate | 10 |
| 2-ethylhexylacrylate | 5 |
| t-butyl styrene | 5 |
| vinyl toluene | 5 |
| methyl methacrylate | 22 |

EXAMPLE 21

The procedure of Example 1 is repeated with the difference that the following monomers are used to form the copolymer:

| Reactants | Percent by Weight of Total Reactants |
|---|---|
| glycidyl methacrylate | 18 |
| tetrahydrophthalic anhydride | 6 |
| butyl methacrylate | 35 |
| alpha-methyl styrene | 5 |
| chlorostyrene | 5 |
| ethyl acrylate | 5 |
| methyl methacrylate | 26 |

EXAMPLE 22

The procedure of Example 1 is repeated with the difference that the following monomers are used to form the copolymer:

| Reactants | percent by Weight of Total Reactants |
|---|---|
| glycidyl methacrylate | 15 |
| dichloromaleic anhydride | 7 |
| butyl methacrylate | 50 |
| hexyl acrylate | 5 |
| methyl methacrylate | 23 |

EXAMPLE 23

The procedure of Example 22 is repeated except for the difference that an equimolar amount of citraconic anhydride is substituted for the dichloromaleic anhydride.

The foregoing examples are illustrative of the invention hereinafter claimed. It will be apparent to those skilled in the art that many modifications of these examples will fall within the scope of the teachings of this specification and within the scope of the appended claims.

We claim:

1. In a method for coating a metal substrate wherein a thermosettable, film-forming powder is electrostatically sprayed upon said substrate and crosslinked thereon with heat, the improvement wherein said thermosetable film-forming powder consists essentially of a blend of
   A. about 2 to about 8 weight percent of a polymer of monomeric anhydrides of saturated dicarboxylic acids having a molecular weight in the range of about 300 to about 4,000, and
   B. about 92 to about 98 weight percent of an epoxy-functional, anhydride-functional copolymer of monoethylenically unsaturated monomers consisting essentially of about 10 to about 25 percent by weight of a glycidyl ester of a monoethylenically unsaturated acid, about 4 to about 12 percent by weight of a monomeric anhydride of an olefinically unsaturated dicarboxylic acid, and about 92 to about 63 to about 86 percent by weight of mono-functional, ethylenically unsaturated monomers, said copolymers being further characterized in having an average molecular weight in the range of about 2,000 to about 10,000 and a glass transition temperature in the range of about 40°C to about 90°C.
   C. 0.05 to 4.0 weight percent of a polymeric flow control agent based on the weight of (A) and (B).

2. A method in accordance with claim 1 wherein said polymer of monomeric anhydrides of saturated dicarboxylic acids has molecular weight in the range of about 1,500 to about 2,500.

3. A method in accordance with claim 1 wherein said copolymer has a glass transition temperature in the range of about 50°C to about 70°C.

4. A method in accordance with claim 1 wherein said glycidyl ester of a monoethylenically unsaturated acid is glycidyl methacrylate and comprises about 12 to about 18 percent by weight of said copolymer.

5. A method in accordance with claim 1 wherein said monomeric anhydrides of saturated dicarboxylic acids are selected from the group consisting of maleic anhydride, citraconic anhydride, itaconic anhydride, dodecenyl succinic anhydride, dichloromaleic anhydride, and tetrahydrophthalic anhydride.

6. A thermosettable powder coating composition which exlusive of pigments and non-reactive materials consists essentially of a blend of
- A. about 2 to about 8 weight percent of a polymer of monomeric anhydrides of saturated dicarboxylic acids having a molecular weight in the range of about 300 to about 4,000, and
- B. about 92 to about 98 weight percent of an epoxy-functional, anhydride-functional copolymer of monoethylenically unsaturated monomers consisting essentially of about 10 to about 25 percent by weight of a glycidyl ester of a monoethylenically unsaturated acid, about 4 to about 12 percent by weight of a monomeric anhydride of an olefinically unsaturated dicarboxylic acid, and about 92 to about 63 to about 86 percent by weight of monofunctional, ethylenically unsaturated monomers, said copolymer being further characterized in having an average molecular weight in the range of about 2,000 to about 10,000 and a glass transition temperature in the range of about 40° to about 90°C.
- C. 0.05 to 4.0 weight percent of a polymeric flow control agent based on the weight of (A) and (B).

7. A method in accordance with claim 6 wherein said polymer of monomeric anhydrides of saturated dicarboxylic acids has molecular weight in the range of about 1,500 to about 2,500.

8. A method in accordance with claim 6 wherein said copolymer has a glass transition temperature in the range of about 50° to about 70°C.

9. A method in accordance with claim 6 wherein said glycidyl ester of a monoethylenically unsaturated acid is glycidyl methacrylate and comprises about 12 to about 18 percent by weight of said copolymer.

10. A method in accordance with claim 6 wherein said monomeric anhydrides of saturated dicarboxylic acids are selected from the group consisting of maleic anhydride, citraconic anhydride, itaconic anhydride, dodecenyl succinic anhydride, dichloromaleic anhydride, and tetrahydrophthalic anhydride.

* * * * *